United States Patent
Rothberg

(10) Patent No.: US 6,895,455 B1
(45) Date of Patent: May 17, 2005

(54) DISK DRIVE AND METHOD FOR IMPLEMENTING NONSTANDARD DISK-DRIVE COMMANDS ON A SERIAL ATA INTERFACE THAT ONLY SUPPORTS STANDARD ATA DISK-DRIVE COMMANDS

(75) Inventor: Michael S. Rothberg, Foothill Ranch, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 194 days.

(21) Appl. No.: 10/183,207

(22) Filed: Jun. 26, 2002

(51) Int. Cl.[7] ............................................. G06F 13/00
(52) U.S. Cl. ................. 710/74; 710/5; 710/8; 710/33; 710/65; 710/154; 710/156
(58) Field of Search ........................... 710/5, 8, 33, 65, 710/74, 105, 104; 711/154, 156

(56) References Cited

U.S. PATENT DOCUMENTS

| | | | |
|---|---|---|---|
| 5,930,358 A | | 7/1999 | Rao |
| 6,282,501 B1 | * | 8/2001 | Assouad ..................... 702/117 |
| 6,467,054 B1 | * | 10/2002 | Lenny ......................... 714/42 |
| 6,601,119 B1 | * | 7/2003 | Slutz et al. ................ 710/104 |
| 6,639,885 B1 | * | 10/2003 | Yada et al. ............... 369/53.45 |

FOREIGN PATENT DOCUMENTS

WO    WO 99/45535    9/1999

* cited by examiner

Primary Examiner—Jeffrey Gaffin
Assistant Examiner—Mike Nguyen
(74) Attorney, Agent, or Firm—Milad G. Shara, Esq.; Robroy R. Fawcett, Esq.

(57) ABSTRACT

A disk drive is disclosed that is responsive to standard disk-drive commands associated with disk-drive operations and to nonstandard disk-drive commands required for disk drive manufacture and quality testing. The disk drive includes a disk, a head actuated radially over the disk, and a disk control system. The disk control system responds to disk-drive commands and accesses data storage locations on the disk through the head. A serial ATA interface couples the disk control system to a host computer. The serial ATA interface is configured to transfer standard disk-drive commands from the host computer to the disk control system and is configured to not transfer nonstandard disk-drive commands from the host computer to the disk control system. The extracting means extracts a nonstandard disk-drive command that is embedded within a data block accessed using a standard disk-drive command and provides the extracted nonstandard disk-drive command to the disk control system.

17 Claims, 5 Drawing Sheets

SMART WRITE-LOG STANDARD ATA COMMAND — 30

| REGISTER | VALUE |
|---|---|
| FEATURES | b0h (SMART subcommand code) |
| SECTOR COUNT | XXh (write-log command) |
| SECTOR NUMBER | YYh (write-log command) |
| CYLINDER | C24Fh (SMART command enable code) |
| COMMAND | D6h (SMART op code) |

FIG. 3

STANDARD KEY SECTOR FORMAT — 32

| FIELD | BYTE COUNT | DESCRIPTION |
|---|---|---|
| ACTION CODE | 2 | Code for CMD operation to be performed |
| PARAMETER1 | 2 | Depends on CMD operation |
| PARAMETER2 | 2 | Depends on CMD operation |
| PARAMETER3 | 2 | Depends on CMD operation |
| . | . | . |
| . | . | . |
| . | . | . |
| PARAMETER255 | 2 | Depends on CMD operation |

34 → ACTION CODE
36 → PARAMETER1

FIG. 4

| COMMAND TO ENABLE RESPONSE TO NONSTANDARD DISK-DRIVE COMMANDS (REGULAR) ||
|---|---|
| REGISTER | VALUE |
| FEATURES | MMh ("Enable") |
| SECTOR COUNT | n/a |
| SECTOR NUMBER | n/a |
| CYLINDER | VVVVh |
| COMMAND | ZZh (ATA op code) |

FIG. 5

| COMMAND TO DISABLE RESPONSE TO NONSTANDARD DISK-DRIVE COMMANDS (REGULAR) ||
|---|---|
| REGISTER | VALUE |
| FEATURES | NNh ("Disable") |
| SECTOR COUNT | n/a |
| SECTOR NUMBER | n/a |
| CYLINDER | VVVVh |
| COMMAND | ZZh (ATA op code) |

FIG. 6

| COMMAND SEQUENCE TO ENABLE RESPONSE TO NONSTANDARD DISK-DRIVE COMMANDS (WINDOWS) - CMD A ||
|---|---|
| REGISTER | VALUE |
| FEATURES | D5h (Get Security Challenge Code) |
| SECTOR COUNT | XXh |
| SECTOR NUMBER | UUh |
| CYLINDER | C24Fh (SMART enable code) |
| COMMAND | B0h (SMART op code) |

FIG. 7

| COMMAND SEQUENCE TO ENABLE RESPONSE TO NONSTANDARD DISK-DRIVE COMMANDS (WINDOWS) - CMD B ||
|---|---|
| REGISTER | VALUE |
| FEATURES | D6h (Send Security Response Code) |
| SECTOR COUNT | XXh |
| SECTOR NUMBER | UUh |
| CYLINDER | C24Fh (SMART enable code) |
| COMMAND | B0h (SMART op code) |

FIG. 8

| STATUS COMMAND ||
|---|---|
| REGISTER | VALUE |
| FEATURES | D5h (SMART CMD Read-Log Status) |
| SECTOR COUNT | XXh |
| SECTOR NUMBER | YYh |
| CYLINDER | C24Fh (SMART enable code) |
| COMMAND | B0h (SMART op code) |

FIG. 9

DISK DRIVE AND METHOD FOR IMPLEMENTING NONSTANDARD DISK-DRIVE COMMANDS ON A SERIAL ATA INTERFACE THAT ONLY SUPPORTS STANDARD ATA DISK-DRIVE COMMANDS

BACKGROUND OF THE INVENTION

1. Field of the Invention

The present invention relates to a disk drive command interface, and more particularly, to a disk drive for implementing nonstandard disk-drive commands on a serial ATA interface that only supports standard ATA disk-drive commands.

2. Description of the Prior Art

A standard parallel ATA interface uses a 40 pin connector and a bulky flat ribbon cable that is becoming unable to accommodate further growth in the data transfer capacity of the interface. A serial ATA interface is emerging that can accommodate growth in data transfer capacity and that uses a significantly smaller 7 conductor connector. The connector includes a receive differential pair of conductors and a transmit differential pair of conductors. The remaining three conductors are ground connections. The serial ATA interface does not provide for nonstandard (or vendor specific) disk-drive commands. Typically, nonstandard disk-drive commands are used primarily during disk-drive manufacture and quality testing. Providing a separate nonstandard disk-drive command interface would add to the cost of the disk drive.

Accordingly, there exists a need for a disk drive that implements nonstandard disk-drive commands on a serial ATA interface that only supports standard ATA disk-drive commands. The present invention satisfies theses needs.

SUMMARY OF THE INVENTION

The present invention may be embodied in a disk drive connectable to a host computer, and responsive to standard disk-drive commands associated with disk-drive operations and to nonstandard disk-drive commands required for disk drive manufacture and quality testing. The disk drive includes a disk, a head actuated radially over the disk, a disk control system, a serial ATA interface, and means for extracting a nonstandard disk-drive command. The disk control system responds to disk-drive commands and accesses data storage locations on the disk through the head. The serial ATA interface couples the disk control system to the host computer when the disk drive is connected to the host computer. The serial ATA interface is configured to transfer standard disk-drive commands from the host computer to the disk control system and is configured to not transfer nonstandard disk-drive commands from the host computer to the disk control system. The extracting means extracts a nonstandard disk-drive command that is embedded within a data block accessed using a standard disk-drive command and provides the extracted nonstandard disk-drive command to the disk control system.

In more detailed features of the invention, the data block may include an action code field, and may further include at least one parameter field. The nonstandard disk-drive commands may comprise a first command subset and a second command subset. The first command subset may include a command to enable response to the second command subset, and the disk control system may be responsive to an extracted nonstandard disk-drive command from the second command subset only after the enable command is received by the disk drive from the host computer. The first command subset also may include a status command to determine whether the disk drive has received the enable command and the disk control system is responsive to an extracted nonstandard disk-drive command from the second command subset.

The present invention also may be embodied in a method for transmitting a nonstandard disk-drive command to the disk drive. In the method, a nonstandard disk-drive command is embedded within a data block accessible using a standard disk-drive command. The standard disk-drive command is transmitted from the host computer through the serial ATA interface to the disk control system such that the standard disk-drive command causes the data block to be transferred from the host computer to the disk control system. The nonstandard disk-drive command that is embedded within the data block is extracted and provided to the disk control system.

In another embodiment of the invention, a disk drive, connectable to a host computer, has a host interface for receiving data blocks and commands from the host, and has a control system for processing the received host commands and data blocks. The control system includes a first means for processing a first subset of the received host commands, wherein the first subset of host commands is defined in an industry standard, a second means for processing a second subset of the received host commands, wherein the second subset of host commands is not defined in the industry standard, and a third means for processing one of the first subset of received host commands to enable the second means to process the second subset of received host commands.

In more detailed features of the invention, the third means, in response to a first enabling command, may generate a security challenge code for transmission in a data block to the host computer. The host computer, in response to the security code, may generate a security validation code for transmission to the disk drive and for processing by the third means. The security challenge code may be randomly generated by the third means, and the security validation code may be generated by the host computer using a security algorithm applied to the security challenge code. Also, a received command of the second subset of host commands may be embedded in a data block associated with a received command of the first subset of host commands.

BRIEF DESCRIPTION OF THE DRAWINGS

The accompanying drawings illustrate embodiments of the present invention and, together with the description, serve to explain the principles of the invention.

FIG. 3 shows a disk-drive command format for embedding a nonstandard disk-drive command in a data block.

FIG. 4 shows a data block format for embedding a nonstandard disk-drive command.

FIG. 5 shows a disk-drive command format for enabling response to nonstandard disk-drive commands.

FIG. 6 shows a disk-drive command format for disabling response to nonstandard disk-drive commands.

FIG. 7 shows a disk-drive command format for requesting a security challenge code.

FIG. 8 shows a disk-drive command format for sending a security response code.

FIG. 9 shows a disk-drive command format for requesting a status response.

DETAILED DESCRIPTION

Figure 1:
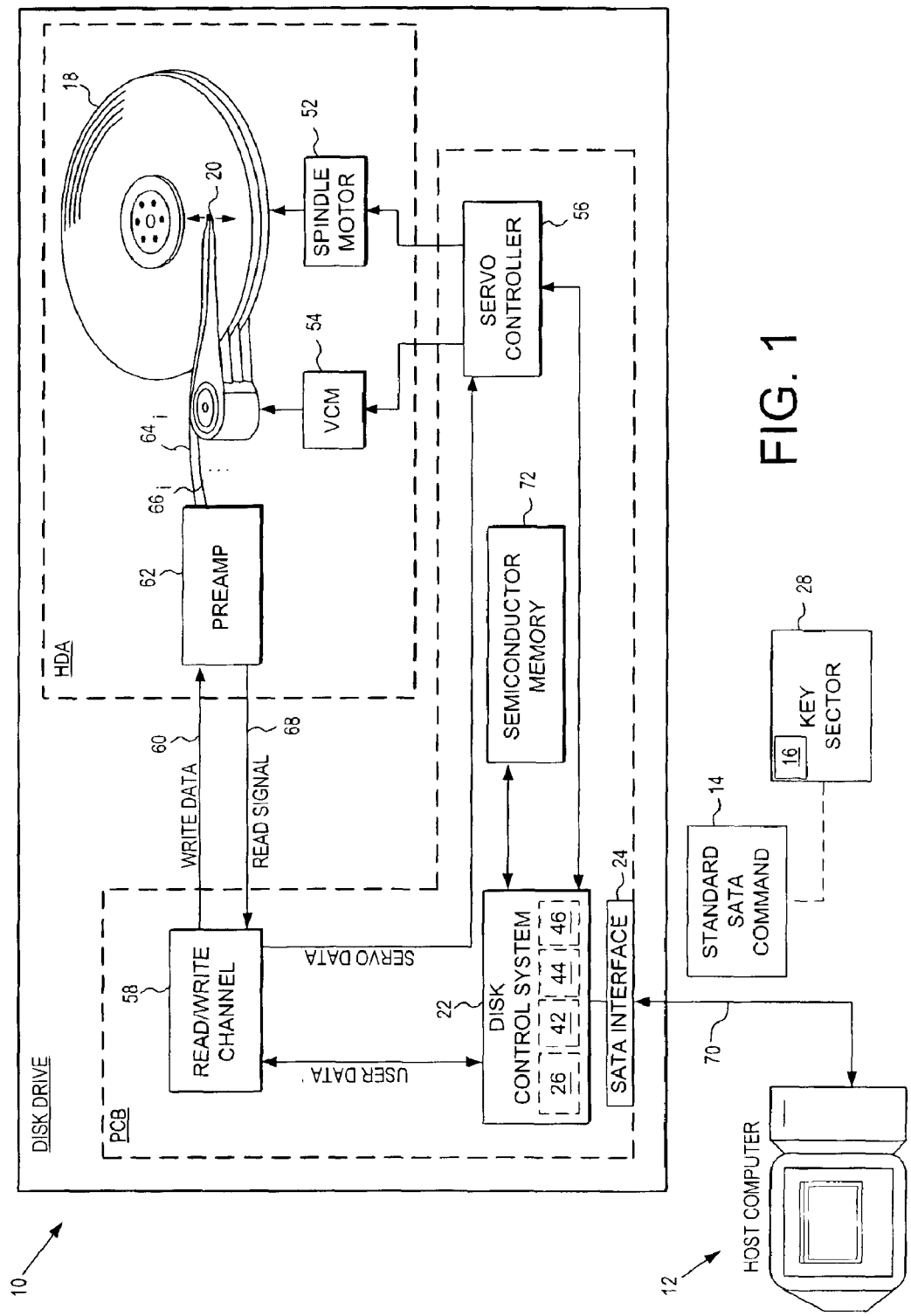
FIG. 1 is a block diagram of a disk drive for implementing nonstandard disk-drive commands on a serial ATA interface that only supports standard ATA disk-drive commands, according to the present invention.

With reference to FIG. 1, the invention may be embodied in a disk drive 10 connectable to a host computer 12, and responsive to standard disk-drive commands 14 associated with disk-drive operations and to nonstandard disk-drive commands 16 required for disk drive manufacture and quality testing. The disk drive includes a disk 18, a head 20 actuated radially over the disk, a disk control system 22, a serial ATA (SATA) interface 24, and means 26 for extracting a nonstandard disk-drive command. The disk control system responds to disk-drive commands and accesses data storage locations on the disk through the head. The serial ATA interface couples the disk control system to the host computer when the disk drive is connected to the host computer. The serial ATA interface is configured to transfer standard disk-drive commands from the host computer to the disk control system and is configured to not transfer nonstandard disk-drive commands from the host computer to the disk control system. The extracting means extracts a nonstandard disk-drive command that is embedded within a data block 28 accessed using a standard disk-drive command and provides the extracted nonstandard disk-drive command to the disk control system.

Figure 2:
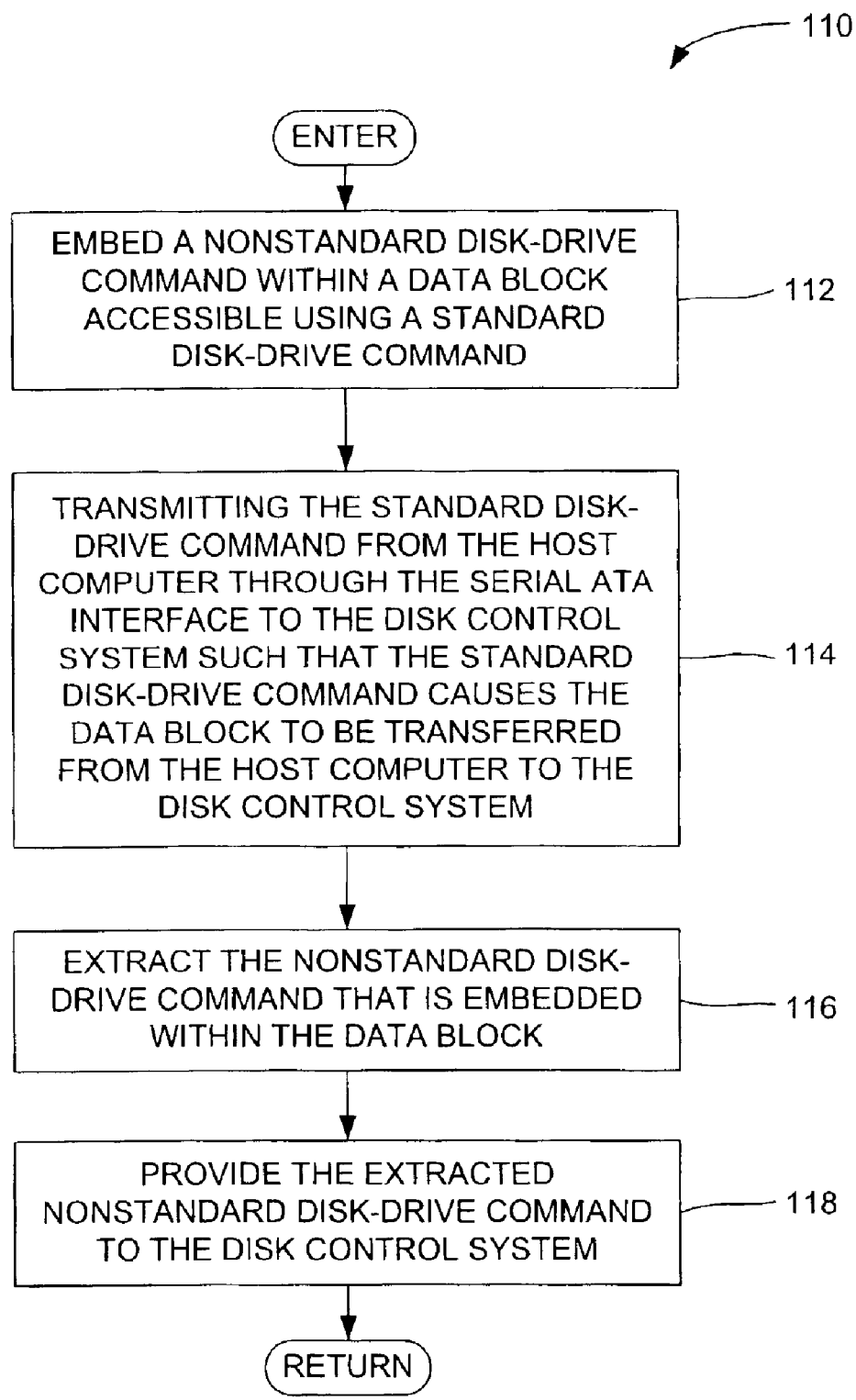
FIG. 2 is a flow chart illustrating a method for implementing nonstandard disk-drive commands on a serial ATA interface that only supports standard ATA disk-drive commands, according to the present invention.

With reference to FIG. 2, the invention may be embodied in a related method 110 for transmitting a nonstandard disk-drive command 16 to the disk drive 10. In the method, a nonstandard disk-drive command is embedded within a data block 28 accessible using a standard disk-drive command 14 (step 112). The standard disk-drive command is transmitted from the host computer 12 through the serial ATA interface 24 to the disk control system 22 such that the standard disk-drive command causes the data block to be transferred from the host computer to the disk control system (step 114). The nonstandard disk-drive command that is embedded within the data block is extracted (step 116) and provided to the disk control system (step 118).

With reference to FIGS. 3 and 4, the standard disk drive command 14 may be a Self Monitoring Analysis and Reporting Technology (SMART) write-log command 30 that instructs the disk control system 22 to receive the data block 28. The SMART write-log command is within the SATA command set. The use of SMART commands to configure a disk drive are described in more detail in U.S. patent application Ser. No. 10/004,231, filed Oct. 31, 2001, and titled DISK DRIVE FOR RECEIVING SETUP DATA IN A SELF MONITORING ANALYSIS AND REPORTING TECHNOLOGY (SMART) COMMAND, which application is incorporated herein by reference.

The data block 28 may be a key sector 32 (FIG. 4) having 512 data bytes. The data block may include a two-byte action code field 34, and may further include at least one two-byte parameter field 36. The action code and parameter fields provide the mechanism for transferring the nonstandard disk-drive commands 16 from the host computer 12, through the SATA interface 24, and to the disk control system 22. Examples of nonstandard disk-drive commands may include: INITIATE POWER-ON RESET SEQUENCE, GET DRIVE DATA TABLE, READ/RESET ERROR RATE TABLE, SET TRACK OFFSET, SEEK TO TRACK, etc. Each command is assigned a unique action code, and appropriate parameters are defined. A disk-drive manufacturer may implement a wide variety of nonstandard disk-drive or "native" commands for the manufacture and quality testing of the disk drive. Because the nonstandard disk-drive commands are embedded in the key sector 32, the commands may be transmitted to the disk drive over the SATA interface, avoiding the need for a separate specific command interface.

The nonstandard disk-drive commands 16 may comprise a first command subset and a second command subset. The first command subset may include a command to enable response to the second command subset, shown in FIG. 5, and the disk control system 22 may be responsive to an extracted nonstandard disk-drive command from the second command subset only after the enable command is received by the disk drive 10 from the host computer 12. The first command subset may include a command to disable response to the second command set, shown in FIG. 6. The first command subset also may include a status command to determine whether the disk drive has received the enable command and the disk control system is responsive to an extracted nonstandard disk-drive command from the second command subset.

In an alternative embodiment of the invention, the disk drive 10 (FIG. 1) may have an interface 24 for receiving data blocks 28 and commands 14 from the host computer 12, and have a control system 22 for processing the received host commands and data blocks. The control system includes a first means 42 for processing a first subset of the received host commands, wherein the first subset of host commands is defined in an industry standard, a second means 44 for processing a second subset of the received host commands, wherein the second subset of host commands is not defined in the industry standard, and a third means 46 for processing one of the first subset of received host commands to enable the second means to process the second subset of received host commands. The first subset of host commands may comprise the ATA standard commands and the second subset of host commands may comprise vendor specific or "native" commands developed for a specific disk-drive model by the disk-drive manufacturer.

A received command 16 of the second subset of host commands may be embedded in a data block 28 associated with a received command 14 of the first subset of host commands. Further, the third means 46, in response to a first enabling command CMD A, shown in FIG. 7, may generate a security challenge code for transmission in a data block to the host computer 12. The host computer, in response to the security code, may generate a security response code for transmission to the disk drive 10 and for processing by the third means. A second enabling command CMD B, shown in FIG. 8, may be used to transmit the security response code to the disk drive in a second data block. The security challenge code may be randomly generated by the third means, and the security response code may be generated by the host computer using a security algorithm applied to the security challenge code. The use of the first and second enabling command may be particularly advantageous if the host computer is using an operating system that does not support the use of the enable and disable commands of FIGS. 5 and 6. Also, the two-step security measures may hinder malicious access to the disk drive using the nonstandard disk-drive commands.

A status command 48, shown in FIG. 9, may provide information regarding whether the disk drive 10 has been enabled to respond to SMART write-log commands. The status command may be a SMART read-log command that transfers a status sector from the disk drive to the host. The disk drive may receive and respond to the status command regardless of whether the disk drive has been enabled to receive SMART write-log commands.

The disk drive 10 of FIG. 1 further comprises a spindle motor 52 for rotating the disk 18 and a voice coil motor (VCM) 54 for actuating the head 20 radially over the disk 18. A servo controller 56 generates the appropriate control signals applied to the spindle motor 52 and VCM 54 in response to commands received from the disk controller 22. During a write operation the disk controller 22 transmits user data received from the host computer 12 to a read/write channel 58. The read/write channel 58 performs appropriate encoding of the user data to generate write data 60 written to the disk 18. The write data 60 modulates the operation of a preamp 62 to generate a write signal 64, applied to the head 20 in order to write magnetic transitions onto the surface of the disk 18. During a read operation, the head 20 detects the magnetic transitions representing the recorded data to generate a read signal 66, which is amplified by the preamp 62 to generate a read signal 68 applied to the read/write channel 58. The read/write channel 58 demodulates the read signal 68 into user data transmitted to the host computer 12 via the disk controller 22 after correcting errors.

The disk drive 10 communicates with the host computer 12 over a SATA cable 70 using a communication protocol referred to as the IDE protocol. The IDE protocol includes a definition of the industry standard ATA command set. The host computer's operating system may comprises a low level "port" driver which communicates with the disk drive 10 through a data structure. There are only a limited number of IDE commands supported by disk drive manufacturers as well as some operating systems. The standard IDE protocol may provide no support for modifying the configuration parameters of a disk drive by a computer program running under some operating systems. However, the standard IDE protocol does provide support for the SMART command set which allows a computer program running under such an operating system to configure a disk drive so that it will accumulate and report diagnostic information. Thus, the host computer can evaluate the health of the disk drive and report impending failures to the user so that remedial measures can be taken before data is lost.

The disk 18, spindle motor 52, VCM 54, preamp 62, and related hardware may be integrated into a head-disk assembly (HDA). The disk control system 22, SATA interface 24, semiconductor memory 72, servo controller 56, read/write channel 58, and related electronics may be mounted on a printed circuit board (PCB). The disk control system 22 generally includes circuitry and processors that control the HDA and that provide an intelligent control interface between the host computer 12 and the HDA for execution of disk-drive commands. The disk control system may have an internal microprocessor and nonvolatile memory for implementing the techniques of the invention. The semiconductor memory may have nonvolatile memory and volatile random access memory (RAM). Program code for implementing the components and techniques of the invention, such as the extracting means 26, first means 42, second means 44, and third means 46, may be stored in the nonvolatile memory and transferred to the RAM for execution by the microprocessor.

I claim:

1. A disk drive connectable to a host computer, and responsive to standard disk-drive commands associated with disk-drive operations and to nonstandard disk-drive commands required for disk manufacture and quality testing, the disk drive comprising;
    a disk;
    a head actuated radially over the disk;
    a disk control system for responding to the standard and nonstandard disk-drive commands and for accessing data storage locations on the disk through the head, wherein the standard disk drive commands include a Self Monitoring Analysis and Reporting Technology (SMART) write-log command;
    a serial ATA interface for coupling the disk control system to the host computer when the disk drive is connected to the host computer, wherein the serial ATA interface is configured to transfer standard disk-drive commands from the host computer to the disk control system and is configured to not transfer non-standard disk-drive commands from the host computer to the disk control system; and
    means for extracting a nonstandard disk-drive command that is embedded within a data block accessed using a SMART write-log command, and providing the extracted nonstandard disk-drive command to the disk control system.

2. A disk drive as defined in claim 1, wherein the data block includes an action code field.

3. A disk drive as defined in claim 2, wherein the data block further includes at least one parameter field.

4. A disk drive as defined in claim 1, wherein
    the nonstandard disk-drive commands comprise a first command subset and a second command subset;
    the first command subset includes a command to enable response to the second command subset; and
    the disk control system is responsive to an extracted nonstandard disk-drive command from the second command subset only after the enable command is received by the disk drive from the host computer.

5. A disk drive as defined in claim 4, wherein the first command subset includes a status command.

6. A disk drive as defined in claim 4, wherein the first command subset includes a command to determine whether the disk drive has received the enable command and the disk control system is responsive to an extracted nonstandard disk-drive command from the second command subset.

7. In a disk drive connected to a host computer, and responsive to standard disk-drive commands associated with disk-drive operations and to nonstandard disk-drive commands required for disk-drive manufacture and quality testing, the disk drive including a disk, a head actuated radially over the disk, a disk control system for responding to disk-drive commands and for accessing data storage locations on the disk through the head, and a serial ATA interface for coupling the disk control system to the host computer when the disk drive is connected to the host computer, wherein the serial ATA interface is configured to transfer standard disk-drive commands from the host computer to the disk control system and is configured to not transfer nonstandard disk-drive commands form the host computer to the disk control system, and the standard disk drive commands include a Self Monitoring Analysis and Reporting Technology (SMART) write-log command, a method for transmitting a nonstandard disk-drive command to the disk drive, comprising:
    embedding a nonstandard disk-drive command within a data block accessible using a SMART write-log command;
    transmitting the SMART write-log command from the host computer through the serial ATA interface to the disk control system, wherein the SMART write-log command causes the data block to be transformed from the host computer to the disk control system;

extracting the nonstandard disk-drive command that is embedded within the data block; and providing the extracted nonstandard disk-drive command to the disk control system.

8. A method for transmitting a nonstandard disk-drive command to a disk drive as defined in claim 7, wherein the data block includes an action code field.

9. A method for transmitting a nonstandard disk-drive command to a disk drive as defined in claim 8, wherein the data block further includes at least one parameter field.

10. A method for transmitting a nonstandard disk-drive command to a disk drive as defined in claim 7, wherein the nonstandard disk-drive commands comprise a first command subset and a second command subset;

the first command subset includes a command to enable response to the second command subset; and the disk control system is responsive to an extracted nonstandard disk-drive command from the second command subset only after the enable command is received by the disk drive from the host computer.

11. A method for transmitting a nonstandard disk-drive command to a disk drive as defined in claim 10, wherein the first command subset includes a status command.

12. A method for transmitting a nonstandard disk-drive command to a disk drive as defined in claim 10, wherein the first command subset includes a command to determine whether the disk drive has received the enable command and the disk control system is responsive to an extracted nonstandard disk-drive command from the second command subset.

13. A disk drive, connectable to a host computer, having a host interface for receiving data blocks and commands from the host, the disk drive comprising:

a control system for processing the received host commands and data blocks;

the control system comprising;

first means for processing a first subset of the received host commands, wherein the first subset of host commands is defined in an industry standard and includes a Self Monitoring Analysis and Reporting Technology (SMART) write-log command;

second means for processing a second subset of the received host commands, wherein the second subset of host commands is not defined in the industry standard; and third means for processing a received SMART write-log command to enable the second means to process the second subset of received host commands.

14. A disk as defined in claim 13, wherein a received command of the second subset of host commands is embedded in a data block associated with a received command of the first subset of host commands.

15. A disk drive connectable to a host computer, having a host interface for receiving data blocks and commands from the host, the disk drive comprising:

a control system for processing the received host commands and data blocks;

the control system comprising:

first means for processing a first subset of the received host commands, wherein the first subset of host commands is defined in an industry standard;

second means for processing a second subset of the received host commands, wherein the second subset of host commands is not defined in the industry standard; and third means for processing one of the first subset of received host commands to enable the second means to process the second subset of received host commands, wherein the third means, in response to a first enabling command, generates a security challenge code for transmission in a data block to host computer.

16. A disk as defined in claim 15, wherein the host computer, in response to the security code, generates a security validation code for transmission to the disk drive and for processing by the third means.

17. A disk drive as defined in claim 16, wherein the security challenge code is randomly generated by the third means, and the security validation code is generated by the host computer using a security algorithm applied to the security challenge code.

* * * * *